(12) United States Patent
Couture et al.

(10) Patent No.: US 12,147,542 B1
(45) Date of Patent: Nov. 19, 2024

(54) FIELD-DEPLOYABLE HARDWARE APPARATUS

(71) Applicant: Parry Labs, LLC, Alexandria, VA (US)

(72) Inventors: Marc Couture, Alexandria, VA (US); Michael Palmer, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/422,437

(22) Filed: Jan. 25, 2024

(51) Int. Cl.
| | |
|---|---|
| *G06F 1/24* | (2006.01) |
| *G06F 9/455* | (2018.01) |
| *G06F 21/57* | (2013.01) |
| *G06F 9/4401* | (2018.01) |

(52) U.S. Cl.
CPC ........ *G06F 21/575* (2013.01); *G06F 9/45558* (2013.01); *G06F 9/4401* (2013.01); *G06F 2009/45587* (2013.01)

(58) Field of Classification Search
CPC .............. G06F 21/575; G06F 9/45558; G06F 2009/45587
USPC ............................................................ 713/2
See application file for complete search history.

(56) References Cited

U.S. PATENT DOCUMENTS

| | | |
|---|---|---|
| 9,203,855 B1 | 12/2015 | Mooring et al. |
| 10,699,003 B2 | 6/2020 | Zamir et al. |
| 11,016,793 B2 | 5/2021 | Tsirkin |
| 11,475,140 B1 | 10/2022 | Buonora |
| 11,507,375 B2 * | 11/2022 | Appu ...................... G06F 9/462 |
| 11,789,764 B2 * | 10/2023 | Vidyadhara ......... G06F 9/45558 718/1 |
| 2017/0259956 A1 * | 9/2017 | Hori ........................ F25B 21/04 |

(Continued)

FOREIGN PATENT DOCUMENTS

| | | |
|---|---|---|
| CN | 106161538 B | 6/2020 |
| IN | 202341048657 A | 9/2023 |
| WO | 2016102055 A2 | 6/2016 |

OTHER PUBLICATIONS

Santiago Lozano et al; A Comprehensive Survey on the Use of Hypervisors in Safety-Critical Systems; Received Mar. 9, 2023, accepted Mar. 29, 2023, date of publication Apr. 5, 2023, date of current version Apr. 14, 2023. Digital Object Identifier 10.1109/ACCESS.2023.3264825.

(Continued)

*Primary Examiner* — Volvick Derose
(74) *Attorney, Agent, or Firm* — Caldwell Intellectual Property Law

(57) ABSTRACT

In an aspect, a field-deployable hardware apparatus includes a stackable housing, a graphical processing unit disposed within the stackable housing, the graphical processing unit comprising a first plurality of processor cores, a general-purpose processor disposed within the stackable housing, the general-purpose processor comprising a second plurality of processor cores, at least a binary unit system disposed within the stackable housing and connecting the graphical processing unit to the general-purpose processor, and a memory communicatively connected to at least a core of the first plurality of cores and the second plurality of cores, the memory containing instructions configuring the at least a core to execute a hypervisor, wherein the hypervisor generates a virtual environment on the at least a core.

19 Claims, 9 Drawing Sheets

(56) References Cited

U.S. PATENT DOCUMENTS

| | | | | |
|---|---|---|---|---|
| 2018/0145913 | A1* | 5/2018 | Nicol | G06F 13/4022 |
| 2021/0373600 | A1* | 12/2021 | Cheng | G06F 1/1669 |
| 2021/0409377 | A1* | 12/2021 | Hohne | H04W 12/06 |
| 2022/0091870 | A1* | 3/2022 | Khan | G06F 8/656 |
| 2023/0092214 | A1 | 3/2023 | Wu et al. | |
| 2023/0097002 | A1* | 3/2023 | Sharfi | H05K 7/20436 |
| | | | | 361/679.01 |
| 2023/0109990 | A1* | 4/2023 | Pappu | G06T 1/20 |
| | | | | 345/501 |
| 2023/0147827 | A1* | 5/2023 | Macha | H04L 9/3263 |
| | | | | 713/156 |

OTHER PUBLICATIONS

Shuang Zhang; Virtualization Airborne Trusted General Computing Technology; Appl. Sci. 2023, 13(3) Published: Jan. 19, 2023.

\* cited by examiner

FIELD-DEPLOYABLE HARDWARE APPARATUS

FIELD OF THE INVENTION

The present invention generally relates to the field of computer architecture. In particular, the present invention is directed to a field-deployable hardware apparatus.

BACKGROUND

Hardware platforms are facing increasing demands for security, reliability, flexibility, and processing power. Existing solutions fall short, particularly in specialized applications such as military deployment SUMMARY OF THE DISCLOSURE In an aspect, a field-deployable hardware apparatus includes a stackable housing, a graphical processing unit disposed within the stackable housing, the graphical processing unit comprising a first plurality of processor cores, a general-purpose processor disposed within the stackable housing, the general-purpose processor comprising a second plurality of processor cores, at least a binary unit system disposed within the stackable housing and connecting the graphical processing unit to the general-purpose processor, and a memory communicatively connected to at least a core of the first plurality of cores and the second plurality of cores, the memory containing instructions configuring the at least a core to execute a hypervisor, wherein the hypervisor generates a virtual environment on the at least a core.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

This disclosure describes various exemplary embodiments of a field-deployable hardware apparatus including GPU and GPP components connected by a BUS and enclosed in a stackable housing. A hypervisor may operate on hardware components to implement one or more virtual environments such as real-time operating systems, containers, or the like. Apparatus may use trusted-boot and/or attested computing technology to ensure integrity of hypervisor, virtual environment, and downstream applications operating on apparatus. In exemplary embodiments, field-deployable hardware apparatus may function to perform localized operations that can replace some or all server-side or cloud-based architectures used for computationally intensive operations such as machine learning, artificial intelligence, or the like. Field-deployable hardware apparatus may be incorporated in a modular system with other field-deployable hardware apparatuses as disclosed herein, with additional modular and/or field-deployable hardware elements, with on-board computing devices and/or systems of vehicles or other units used in the field, and/or with various peripheral devices. Systems executing on top of hypervisor may be configured for safety-critical and/or mission critical usages, among other non-limiting examples.

Figure 1:
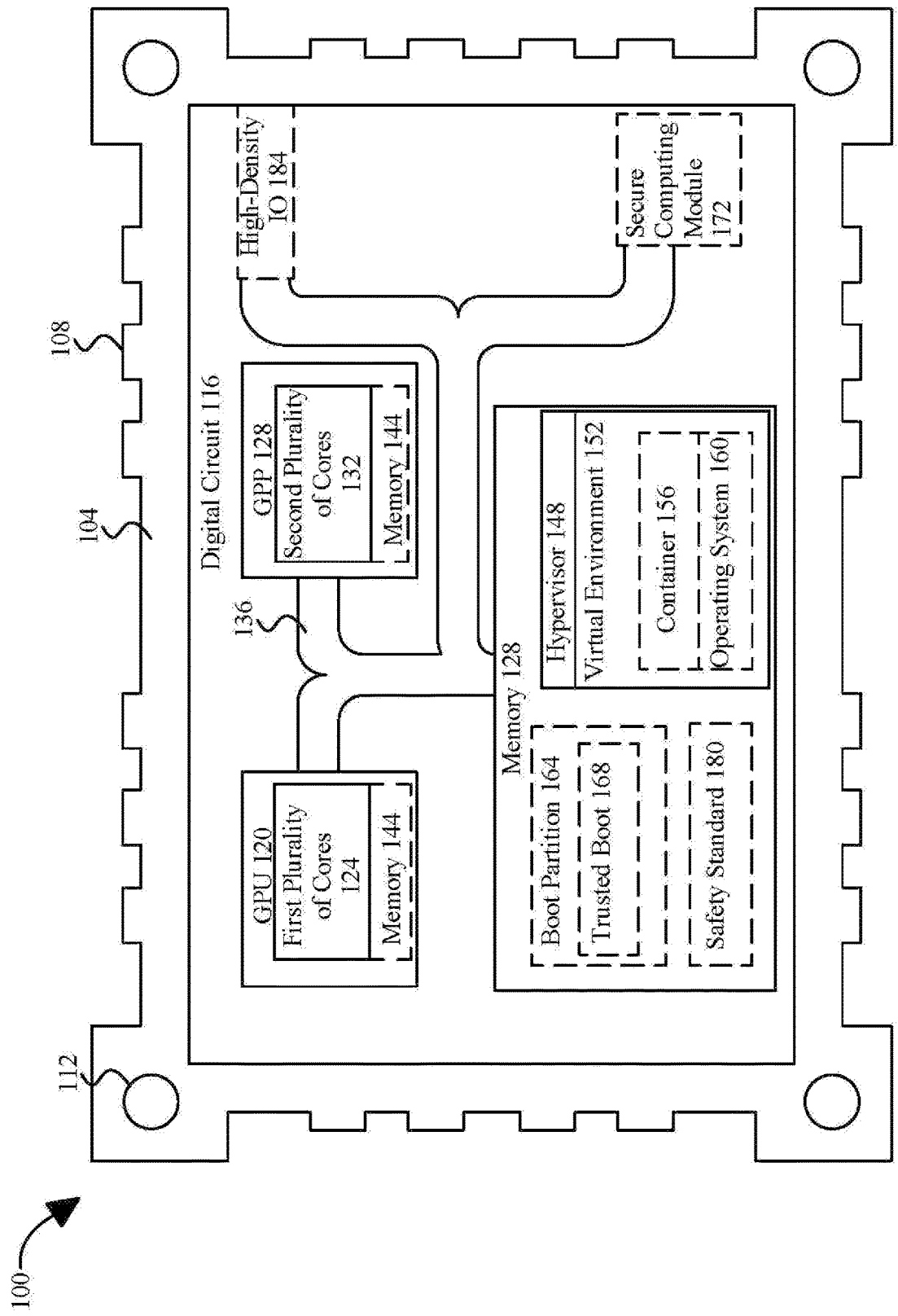
FIG. 1 is a block diagram illustrating an exemplary embodiment of a field-deployable hardware apparatus.

Referring now to FIG. 1, an exemplary embodiment of a field-deployable hardware apparatus 100 is illustrated. Field-deployable hardware apparatus 100 includes a housing 104. Housing 104 may be composed of any suitable material or combination of materials, including without limitation metal such as steel, aluminum, titanium or the like, natural and/or artificial polymer materials such as plastic and/or rubbers, or the like. Housing 104 may be anodized, coated by processes such as spray coating, power coating, electro-plating, or the like, and/or otherwise subjected to any suitable surface treatment. Housing 104 may be waterproof; for instance, housing 104 may have openings that can be sealed using screw-down and/or gasketed closures, such as watertight closures for connectors and/or ports for interfacing with external devices as described in further detail below.

Still referring to FIG. 1, housing 104 and/or field-deployable hardware apparatus 100 may be constructed to match one or more specifications for electromagnetic interference, shock, vibration, and/or power, such as without limitation as specified in MIL-STD-461, MIL-STD-810H and/or MIL-STD-704 standards.

With further reference to FIG. 1, housing 104 may include one or more heat-dissipating elements 108. For example, and without limitation, housing 104 may be constructed of thermally conductive material. Housing 104 and/or field-deployable hardware apparatus 100 may include one or more heat transfer elements to transfer heat from elements of field-deployable hardware apparatus 100 to housing 104 and/or to an exterior of housing 104; such materials and/or elements may include heat-conductive materials connecting electrical elements to housing 104, heat pipes communicating from heat sources within field-deployable hardware apparatus 100 to housing 104, or the like. Exterior of housing 104 may include one or more heat-dissipating elements 108 such as vanes, fins, or other heat-sink materials. In an embodiment, field-deployable hardware apparatus 100 may be configured to be cooled without a fan. Circuit elements of field-deployable hardware apparatus 100 may be operable between −55 and 71 degrees Celsius.

Still referring to FIG. 1, housing 104 may be stackable. As used in this disclosure, a housing 104 is "stackable" if it is configured to be secured on top of or beneath housings 104 of field-deployable hardware apparatuses 100 or similar objects. "Stackable housing" as used herein refers to a design feature or capability of hardware components, such as network switches, that allows multiple units of the same type to be physically stacked on top of each other for convenience and efficiency. Housing 104 may include one or more attachment features 112 for securing housing 104 to one or more additional objects or devices. Attachment features 112 may include any suitable attachment features 112, devices, or components, including bolts, nuts and/or threaded or smooth bolt holes, latches, straps, buckles, or the like. Field-deployable hardware apparatus 100 may be electrically connected to other field-deployable hardware apparatuses 100 or other devices, including devices stacked or otherwise physically joined with or to field-deployable hardware apparatus 100. Persons skilled in the art, upon reviewing the entirety of this disclosure, will be aware of various connections and configurations that may be achieved using field-deployable hardware apparatus 100, housing 104, and/ or one or more additional devices. In an embodiment, modular construction with stacked and/or electrically or communicatively connected devices including or in addition to field-deployable hardware apparatus 100 may be used to assemble a suite of hardware devices with processing, storage, power, size, or other parameters suitable for a mission or design goal.

Continuing to refer to FIG. 1, field-deployable hardware apparatus 100 includes a digital circuit 116. Digital circuit 116 may operate as a computing device having one or more synchronous elements and/or clocks and may be designed and/or configured to perform any method, method step, or sequence of method steps in any embodiment described in this disclosure, in any order and with any degree of repetition. For instance, digital circuit 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Digital circuit 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, field-deployable hardware apparatus 100 and/or digital circuit 116 includes at least a graphical processing unit (GPU 120) disposed within the stackable housing 104, the graphical processing unit comprising a first plurality of processor cores. GPU 120 may include a type of computer chip often used for graphics related tasks such as 3D rendering. In some embodiments, GPU 120 may contain more, smaller, and more specialized cores than a typical general processor, allowing it to run larger sets of functions at once. In addition to 3D rendering, GPU 120 may also be used for other functions, such as those in which operations must be performed on large matrices of data. In some embodiments, GPU 120 may use a system on a module (SOM) design. An "SoM" design may include a module that contains at least a processor and other components, such as without limitation memory 140, storage connectors, and/or other components as described in this disclosure; such design may enable a SOM to function as either a complete or near-complete system. A GPU 120 SOM may be used to create an embeddable module that uses parallel computation. In a non-limiting embodiment, GPU 120 may include an NVIDIA JETSON NX, an NVIDIA Ampere or the like; for instance, GPU 120 may include a 2048-core NVIDIA Ampere with 64 Tensor Cores. GPU 120 may include a first plurality of processor cores, where each "processor core" is a unit within a processor that n receive operation codes and perform operations such as arithmetic, logic, memory 140 retrieval, memory 140 storage, and other operations; one core may be able to perform a first instruction while a second core is able to perform a second instruction simultaneously, or in other words within the same clock cycle, even without pipelining and/or multithreading. Each core may further use multithreading and/or pipelining to perform a plurality of instructions simultaneously. Field-deployable hardware apparatus 100 may include a plurality of GPUs 120 and/or GPU 120 SoMs; for instance, in some embodiment, field-deployable hardware apparatus 100 may include two GPU 120 SoMs.

With continued reference to FIG. 1, field-deployable hardware apparatus and/or digital circuit 116 includes a general-purpose processor (GPP) disposed within the stackable housing 104. GPP 128 may include any suitable processor, such as without limitation a processor incorporating logical circuitry for performing arithmetic and logical operations, such as an arithmetic and logic unit (ALU), which may be regulated with a state machine and directed by operational inputs from memory 140 and/or sensors; GPP 128 may be organized according to Von Neumann and/or Harvard architecture as a non-limiting example. In a non-limiting example, GPP 128 may include a Reduced Instruction Set Computer (RISC) processor. As used in this disclosure, "a reduced instruction set computer (RISC)" is a type of computing device, particularly a microprocessor that is designed to perform a smaller number (ranges from around 50 or less to a few hundred instructions or more) of (computer) instruction at a high speed (within one clock cycle). In some cases, RISC may include a processor using few dozen of simple instructions, which may be executed within a single clock cycle, as opposed to complex instruction set computers (CISC) that have instructions that may take a plurality of clock cycles to execute. In one or more embodiments, instructions may be classified as simple instructions when instructions only contain basic operations, such as, without limitation, arithmetic (e.g., add, subtract, multiply, divide, and/or the like), logical operations (e.g., and, or, not), data movement (import/export, upload, store, and/or the like), and any other desired operations that are designed to be performed quickly and efficiently. In some cases, instructions used by RISC processor may be fixed in length, for example, 32 bits. In some cases, memory 140 access in RISC designs may be limited to load and store instructions such as any instructions as described herein. In some cases, however, operations executed by RISC may take more than one clock cycle, for example, execution time of one or more operations may depend on memory 140 system's speed (but RISC may be configured to keep these operations as fast as possible). In a non-limiting example, memory 140 may be accessed through LOAD i.e., to load a memory 140 location and STORE i.e., to write to it, wherein all other instructions may operate on one or more processor registers and processor may not have direct access to manipulate memory 140. In some cases, RISC processor may include fewer addressing modes than CISC processor to simply hardware components required for decoding and/or executing instructions. In a non-limiting example, instructions may include one or more register-to-register (register-based) operation in which arithmetic and logical operations listed above are performed between registers, and if data is needed from memory 140, the data may be first loaded into at least one register. In some cases, RISC may be capable of pipeline processing, wherein simple and uniform instruction sets may enable optimal pipeline processing; for instance, subsets of instruction sets may be overlapped. Additionally, RISC may operate only on a smaller number of data types (e.g., integer, float, character, Booleans, pointers, and/or the like). RISC may be configured to perform instruction sets in parallel to increase the rate at which instructions are executed. Exemplary RISC may include, without limitation, ARM, MIPS, POWERPC, SPARC, and the like. For instance, and without limitation, GPP 128 may include an ARM processor such as a 12-core ARM® Cortex®-A78AE v8.2 64-bit GPP 128. GPP 128 may include, without limitation, a level 1 (L1) cache, level 2 (L2) cache, and/or level 3 (L3) cache; as a non-limiting example, an L2 cache may have 3 megabytes (MB) of capacity and an L3 cache may have 6 MB of capacity. GPP 128 may include one or more dedicated primary memory 140 components and/or one or more dedicated storage components, for instance and without limitation as described in further detail below.

With continued reference to FIG. 1, field-deployable hardware apparatus 100 and/or digital circuit 116 includes at least a binary unit system (bus) disposed within the stackable housing 104 and connecting the graphical processing unit to the general-purpose processor. bus 136 may connect GPU 120, GPP 128, and/or FPGA. Components connected by bus 136 may communicate using an API configured to enable the division of processing tasks between the FPGA, the GPP 128, and the GPU 120. In some embodiments, an API may allow code to run on varying hardware, such as GPU 120, GPP 128, and/or FPGA, rather than being limited to a particular hardware architecture. In some embodiments, different computing tasks may be performed more efficiently on different architectures. For example, a first computing task may be performed more efficiently on GPU 120, a second computing task may be performed more efficiently on GPP 128, and a third computing task may be performed more efficiently on FPGA. In another example, a computing task may have multiple components which may be split between GPU 120, GPP 128, and FPGA such that all available processing power is used. In some embodiments, inclusion of GPU 120, GPP 128, and/or other elements of digital circuit 116 and/or field-deployable hardware apparatus 100, and division of computing tasks between them; bus 136 may provide improvements to speed and/or efficiency of field-deployable hardware apparatus 100. bus 136 may include any of several types of bus 136 structures including, but not limited to, a memory 140 bus 136, a memory 140 controller, a peripheral bus 136, a local bus 136, and any combinations thereof, using any of a variety of bus 136 architectures.

Still referring to FIG. 1, field-deployable hardware apparatus 100 and/or digital circuit 116 includes a memory 140 communicatively connected to at least a core of the first plurality of cores 124 and the second plurality of cores 132. As used in this disclosure, "communicatively connected" means connected by way of a connection, attachment, or linkage between two or more related which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus 136 or other facility for intercommunication between elements of the field-deployable hardware apparatus 100. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Communicative connection may include, without limitation, connection via bus 136.

Further referring to FIG. 1, memory 140 may include any machine-readable storage medium. A machine-readable storage medium may include any medium that is capable of storing and/or encoding a sequence of instructions and/or data for execution and/or retrieval by a processor. Examples of a machine-readable storage medium include, but are not limited to, a magnetic disk, an optical disc (e.g., CD, CD-R, DVD, DVD-R, etc.), a magneto-optical disk, a read-only memory 140 "ROM" device, a random access memory 140 "RAM" device, a magnetic card, an optical card, a solid-state memory 140 device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory 140. As used herein, a machine-readable storage medium does not include transitory forms of signal transmission.

With continued reference to FIG. 1, memory 140 may include a primary memory 140 and a secondary memory 140. "Primary memory," which may include "random access memory 140" (RAM), for the purposes of this disclosure is a short-term storage device in which information is processed. In one or more embodiments, during use of computing device, instructions and/or information may be transmitted to primary memory 140 wherein information may be processed. In one or more embodiments, information may only be populated within primary memory 140 while a particular software is running. In one or more embodiments, information within primary memory 140 is wiped and/or removed after computing device has been turned off and/or use of a software has been terminated. In one or more embodiments, primary memory 140 may be referred to as "Volatile memory 140" wherein the volatile memory 140 only holds information while data is being used and/or processed. Primary memory 140 may include, without limitation, a per-processor primary memory 140, such as memory 140 included in a SOM with a GPU 120 and/or GPP 128. Per-processor primary memory 140 may be directly connected, and/or connected by bus 136, only to its assigned processor and/or core; alternatively or additionally, per-processor memory 144 140 may be connected via a bus 136 to other processors and/or memory 140 elements, and/or selectively connected thereby, such as without limitation by a connection that may be severable from processors and/or cores that are being partitioned away from its assigned processor, for instance and without limitation when the assigned processor and/or core has been assigned to a different virtual environment 152, operating system 160, and/or container 156 than another processor from which connection is to be severed. Primary memory 140 may also include one or more components of shared memory 140, which may, for instance, be equally accessible all cores, and/or one or more components of GPP 128 memory 140 communicatively coupled to and shared by all GPP 128 cores and/or more components of GPU 120 memory 140 communicatively coupled to and shared by all GPU 120 cores, or the like. In one or more embodiments, volatile memory 140 may lose information after a loss of power.

Still referring to FIG. 1, memory 140 may include one or more elements of secondary memory 140. "Secondary memory," also known as "storage," "hard disk drive" and the like for the purposes of this disclosure is a long-term storage device in which an operating system 160 and other information is stored. Examples of a storage device include, but are not limited to, a hard disk drive, a magnetic disk drive, an optical disc drive in combination with an optical medium, a solid-state memory 140 device, and any combinations thereof. Storage device may be connected to bus 136 by an appropriate interface (not shown). Example interfaces include, but are not limited to, SCSI, advanced technology attachment (ATA), serial ATA, universal serial bus 136 (USB), IEEE 1394 (FIREWIRE), PCIe, and any combinations thereof. Particularly, storage device and an associated machine-readable medium may provide nonvolatile and/or volatile storage of machine-readable instructions, data structures, program modules, and/or other data for digital circuit 116. In one or remote embodiments, information may be retrieved from secondary memory 140 and transmitted to primary memory 140 during use. In one or more embodiments, secondary memory 140 may be referred to as non-volatile memory 140 wherein information is preserved even during a loss of power. In one or more embodiments, data within secondary memory 140 may not be directly accessible by GPU 120 and/or GPP 128; for instance, in one or more embodiments, data may be transferred from secondary to primary memory 140 wherein processor may access information from primary memory 140. Secondary memory 140 may include, without limitation, one or more elements of per-processor and/or per-core elements of secondary memory 140. For instance, each processor and/or core of GPP 128 and/or GPU 120 may be coupled to a dedicated storage component such as without limitation a flash memory 140 or other solid-state memory 140 component, such as without limitation embedded MultiMediaCard (eMMC) NAND flash memory 140 or the like. As a non-limiting illustration, field-deployable hardware apparatus 100 may include 64 gigabytes (GB) of eMMC 5.1 flash memory 140 per GPP 128, per processor, or the like. Secondary memory 140 may alternatively or additionally include one or more elements of shared secondary memory 140, which may include secondary memory 140 that is generally available to all processors and/or processor cores of GPP 128 and/or GPUs 120; shared secondary memory 140 may be partitioned for dedication of partitions to specific virtual environments 152 such as containers 156, virtual machines, or the like, in which case a given partition may be available only to a core or set of cores assigned to its corresponding virtual environment 152. Shared secondary memory 140 may include without limitation any storage device such as without limitation a hard drive and/or solid state hard derive such as, in a non-limiting illustration, a 1 terabyte (TB), 2 TB, or larger-capacity solid state drive, nonvolatile memory 140 express (NVMe) drive, PCIe M 2 solid state drive, and/or a Federal Information Processing Standard (FIPS)-4 NVMe drive; shared secondary memory 140 may be connected to bus 136 and/or digital circuit 116 via any suitable connector, including without limitation via a peripheral component interconnect express (PCIe) connector or the like. One or more GPPs, GPUs, and/or elements of memory may be packaged together in a single module such as without limitation an Nvidia Jetson AGX or the like; multiple such modules may be connected together by elements of bus 136 and/or virtual bus elements to form apparatus 100.

With continued reference to FIG. 1, memory 140 includes one or more instructions configuring the at least a core to execute a hypervisor 148, wherein the hypervisor 148 generates a virtual environment 152 on the at least a core. As used in this disclosure, a "hypervisor 148" is a firmware that creates and manage virtual machines. In one or more embodiments, hypervisor 148 may include a software configured as a virtual machine monitor (VMM). In some cases, hypervisor 148 may be configured to allow a physical machine (host) such as host circuit to run a plurality of operating systems 160 simultaneously by virtualizing system hardware e.g., processors, memory 140, I/O devices, and/or the like. In a non-limiting example, hypervisor 148 may create one or more VMs wherein each VM may host a separate and isolated software operating environment (SOE). In some cases, hypervisor 148 may run directly on the hardware of hosting circuit without reliance of an operating system 160. Instantiating hypervisor 148 may include launching or initializing hypervisor 148 in host operating system 160. In some cases, instantiation of hypervisor 148 may create virtual environment 152 wherein one or a plurality of partitions (i.e., VMs) can be run and managed. In an embodiment, hypervisor 148 may include a "type 1 hypervisor 148" that runs independently of host operating environment. In a non-limiting example, hypervisor 148 may include a bare metal hypervisor 148 that run directly on the host circuit's hardware and manage one or more quest operating systems 160. Exemplary type 1 hypervisor 148 may include, without limitation, MICROSOFT HYPER-V, VMWARE ESXI, XEN, and/or the like. In some cases, VMs created by type 1 hypervisor 148 may communicate directly with the hardware of host circuit rather than host operating system 160. In some cases, VMs created by type 1 hypervisor 148 may not be susceptible to issues caused by the host operating system 160 and/or other VMs in virtual environment 152. In a non-limiting example, one or more VMs may be isolated and unaware of existence of other VMs. In an embodiment, type 1 hypervisor 148 may allow for an increased performance wherein VMs within virtual environment 152 may communicate directly with hardware rather than through the intermediate host operating system 160. In a non-limiting example, type 1 hypervisor 148 may allow one or more VMs to run simultaneously, wherein the failure of a first VM may not result in a failure of a second VM. Virtual machines and/or hypervisors may be implemented, without limitation, as described in U.S. Nonprovisional application Ser. No. 18/395,149, filed on Dec. 22, 2023, the entirety of which is incorporated herein by reference, and/or as described in U.S. Nonprovisional application Ser. No. 18/395,210, filed on Dec. 22, 2023, the entirety of which is incorporated herein by reference.

With continued reference to FIG. 1, in another embodiment, hypervisor 148 may include a "type 2 hypervisor 148" that runs atop host operating system 160 similar to any other software applications. In one or more embodiment, hypervisor 148 may include a hosted hypervisor 148 having resource allocation occurred right above host operating system 160. In some cases, type 2 hypervisor 148 may rely on host operating system 160 of host circuit, whereas in type 1 hypervisor 148 as described above, may only rely on the hardware of host circuit. Exemplary type 2 hypervisor 148 may include, without limitation, VMWARE WORKSTATION, ORACLE VIRTUAL BOX, and/or the like. In some cases, when instantiating type 2 hypervisor 148, at least a processor may launch type 2 hypervisor 148 that has been pre-installed similar to launching any software application. Once host OS is up and running, at least a processor may then start type 2 hypervisor 148 to create, manage and run VMs atop the host OS; however, for type 1 hypervisor 148, since it runs directly on "bare metal" (i.e., hardware without requiring an underlying operating system 160), instantiating type 1 hypervisor 148 may involve booting the system from a medium such as, without limitation, a USB drive, CD, or a network source containing hypervisor 148. Once booted, hypervisor 148 may take control of at least a portion of hardware resources and manage and/or launch one or more VMs.

With continued reference to FIG. 1, at least a processor may then generate a virtualization layer supervised by hypervisor 148, wherein first partition within virtual environment 152 is operated by the virtualization layer. As used in this disclosure, a "virtualization layer" is a software layer (or interface) that sits between hardware layer (e.g., physical GPP 128, memory 140, I/O devices, and/or the like) and virtual environment 152 having one or more VMs. In some cases, virtualization layer may be configured to virtualize the underlaying hardware resources and present the virtualized hardware resources to plurality of VMs as though they are dedicated to each VM. In a non-limiting example, plurality of partitions as described herein may share the same physical hardware resources through virtualization layer, without being aware of each other. In some cases, virtualization layer may be instantiated when hypervisor 148 is booted or launched. In a non-limiting example, in case of a type 1 hypervisor 148, virtualization layer may be generated when machine starts up since hypervisor 148 directly interface with hardware. In another non-limiting example, in case of a type 2 hypervisor 148, virtualization layer may be established once hypervisor 148 software is initiated on top of host OS. In some cases, hypervisor 148 may be configured to monitor and manage one or more hardware abstraction and allocate these virtualized resources to designated VMs. In a non-limiting example, virtualized resources may include GPP 128 time, memory 140 space, I/O operations and/or the like. In some cases, virtualized resources may be allocated based on partition policy as described in detail below. In some cases, hypervisor 148 may manage the scheduling of VM tasks on actual cores. In some cases, hypervisor 148 may handle interruptions, exceptions, and any events that occur, deciding which VM or service needs attention. In some cases, hypervisor 148 may be configured to isolate one or more VMs from rest of VMs to maintain system security and stability. In other cases, hypervisor 148 may be configured to manage lifecycle operations of one or more VMs such as, without limitation, creation, modification, deletion, migration, and/or the like.

With continued reference to FIG. 1, in a non-limiting example, when a first partition is created, a pre-defined set of virtual hardware resources may be provided by virtualization layer, wherein the pre-defined set of virtual hardware resources may include, but is not limited to, cores, portion of virtualized memory 140, virtual disks, virtual network interfaces, among others. As first partition attempts to execute one or more operations or access its "hardware," first partition may actually interface with virtualization layer, for instance, and without limitation, when VM tries to use at least a processor, it may be scheduled by hypervisor 148 onto physical processor on hosting circuit through virtualization layer. In some cases, first partition may perceive resources as if they are dedicated hardware components, oblivious to the abstraction layer beneath. In some cases, virtualization layer may handle I/O operations, translating virtual disk or network accesses to actual operations on the physical hardware. Any interruption, exception, or system call made by first partition may be intercepted by virtualization layer which then communicates with hypervisor 148 to handle or service that request.

With continued reference to FIG. 1, in some cases, hypervisor 148 may include single root input output virtualization (SR-IOV). "Single root input output virtualization" for the purposes of this disclosure is a software capability in which single Peripheral component interconnect express (PCIe) devices may be virtualized into multiple virtual devices. For example, and without limitation, a network adapter may be virtualized wherein multiple virtual adapters may exist. In one or more embodiments, SR-IOV may include the virtualization of physical components such as but not limited to, a GPU 120, network adapter, storage controllers, FPGA devices, audio processing cards, solid state drives and the like. In one or more embodiments, SR-IOV may allow for partitions to access a single physical device. In one or more embodiments, first partition may have direct access to a physical device without an operating system 160 allocating resources. In one or more embodiments, SR-IOV may allow for the sharing of resources, such as for example network adapters, while still maintaining independence. In one or more embodiments, SR-IOV may allow for multiple VMs operating on a hypervisor 148 e.g., type 1 hypervisor 148 to have access to physical devices without an intermediary such as a shot operating system 160. In one or more embodiments, host circuit may contain physical hardware that is capable of virtualization. In one or more embodiments, hypervisor 148 may contain the proper systems and/or software to enable SR-IOV wherein VM may receive a virtual component. In one or more embodiments, SR-IOV may allow for one or more separate virtual environments 152 with direct access to one or more physical hardware components of hosting circuit.

Further referring to FIG. 1, hypervisor 148 may be configured to execute at least a container 156. Hypervisor 148 may be configured to execute at least an operating system 160. Operating system 160 may include any suitable operating system 160, including without limitation Linux, Uniex, BEOS, Windows, or any other operating system 160 that may occur to a person skilled in the art upon reviewing the entirety of this disclosure. For instance, and without limitation, operating system 160 may include an Ubuntu 20.04 LTS with JetPack 4.6.

With continued reference to FIG. 1, hypervisor 148 and/or field-deployable hardware apparatus 100 is configured to generate a virtual environment 152. Virtual environment 152 may include any virtual environment 152 as described in this disclosure. In one or more embodiments, field-deployable hardware apparatus 100 may be configured to generate a virtual environment 152 for each virtual machine of one or more virtual machines. In one or more embodiment, each virtual environment 152 may include a differing operating system 160 wherein a first virtual environment 152 may contain a differing operating system 160 as a second virtual environments 152. In one or more embodiments, field-deployable hardware apparatus 100 may be configured to generate a separate virtual environments 152 within each virtual machine. In one or more embodiments, field-deployable hardware apparatus 100 may be configured to deploy software container 156 (as described in further detail below). In one or more embodiments, software container 156 may be transferred to virtual environment 152 using host operating system 160. In one or more embodiments, host operating system 160 may contain virtual remote, an SSH shell and the like wherein software container 156 may be transmitted to virtual environment 152. In one or more embodiments, host operating system 160 may be configured to create virtual environments 152, virtual machine, virtual script and/or virtual package wherein host operating system 160 may transfer virtual environments 152, virtual machine, virtual script and/or virtual package to one or more partitions. In one or more embodiments, field-deployable hardware apparatus 100 may contain one or more storage devices wherein each storage device may contain virtual machine, virtual environment 152 and the like. In one or more embodiments, field-deployable hardware apparatus 100 may be configured to allocate storage space and/or memory 140 through the creation of partitions as described in further detail below.

With continued reference to FIG. 1, in an embodiment, field-deployable hardware apparatus 100 may be configured to utilize and/or perform edge computing. "Edge computing," as used herein, refers to processing data closer to the source of data generation, rather than relying on centralized-cloud based systems. The "edge" can refer to a variety of locations such as a device, IoT device, on premises-data centers, and the like.

In some embodiments, and still referring to FIG. 1, apparatus may be combined with and/or include two or more sets of components and/or features as described in this disclosure. For instance, two sets of GPU and GPP may be connected via connectors as described herein, including without limitation PCIE connectors and/or ethernet connectors. In some embodiments, virtual environment 152 may include and/or operate on two or more GPPs, GPUs, buses, or the like. Hypervisor 148 may, as a non-limiting example, use a virtual bus to control interactions between elements on different apparatuses, and/or to pass communication between elements that do not share a physical bus. A virtual bus may, for instance, forward communications from one element to another Still referring to FIG. 1, memory 140 may include a boot partition 164. As used in this disclosure, a "partition" is a subdivision of a computer's resources (be it storage, memory 140, processing power, or any other resource) to create an isolated environment. In an embodiment, processes or tasks running in one partition may not interfere with those running in another. In some cases, partition may include memory 140 partition (i.e., a section of a computer's RAM or storage), processor partition (i.e., a set of processor resources or cores), hardware partition (i.e., physical subdivision of core into smaller units), logical partition (i.e., a virtualization of a separate computer), or any combinations thereof. In one or more embodiments, at least a core may be configured to initiate a secure boot process when the system, in some cases, is powered on or restarted. A "boot partition 164" as used in this disclosure is a partition of memory 140 that contains a boot loader, defined as an element of software responsible for booting and/or initiating execution of a hypervisor 148 and/or operating system 160. In some embodiments, boot partition 164 may include a trusted boot 168 module. Trusted boot 168 module is configured to perform a secure proof protocol. Trusted boot 168 is configured to perform an attested boot of the hypervisor 148.

Figure 3:
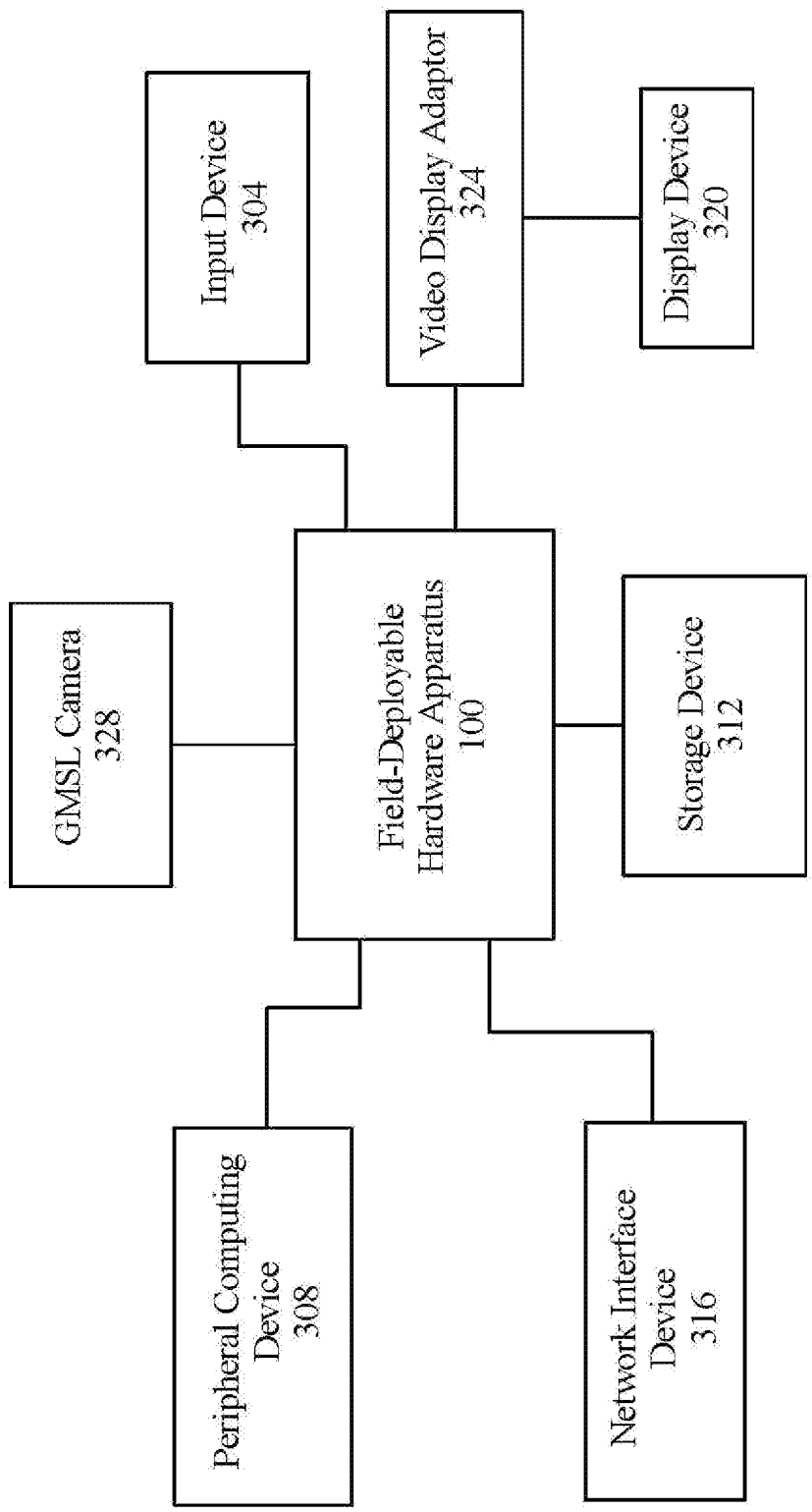
FIG. 3 is a block diagram illustrating an exemplary embodiment of a set of interconnected devices.

Still referring to FIG. 3, in some embodiments, digital circuit 116 may be configured to initiate a secure boot process when digital circuit 116 and/or a field-deployable hardware apparatus 100 digital circuit 116 is powered on or restarted. In some cases, digital circuit 116 may include a secure computing module 172, which may be called and/or activated by trusted bootloader. A "trusted platform module 172," for the purpose of this disclosure, is a specialized chip on an endpoint hardware component (i.e., device) that store keys e.g., cryptographic keys such as encryption keys, decryption keys, public keys, private keys, or any key as described herein. In a non-limiting example, digital circuit 116 may include a plurality of secure computing modules, each containing an RSA key pair known as "Endorsement key (EK)," wherein the RSA key pair may be maintained inside of a secure computing module and cannot be accessed by non-secure software. In some cases, a first partition may include a bootloader (i.e., the first piece of software that runs). In some cases, bootloader may be verified, for example, one or more digital circuit 116 firmware may be configured to check bootloader's digital signature before execution using keys e.g., public keys stored in secure computing module or another secure component. In case where bootloader's signature doesn't match, digital circuit 116 may halt, preventing potential malicious partitions from running. Once bootloader is verified and executed, a hypervisor 148 may be instantiated. In some cases, a hypervisor 148 may also be verified through an associated digital signature to ensure its authenticity. In a non-limiting example, digital circuit 116 may boot only with trusted and authenticated partitions e.g., a primary partition and plurality of child partitions. Child partitions may be verified before loading, or trusted version of second partition may be loaded. Hypervisor 148 may be configured to prevent any child partition that yield a negative response during verification. In some cases, all events during the secure boot process as described herein, including, without limitation, any verification failures or anomalies, can be communicated to primary partition through virtual bus 136. In some cases, these events may be alerted to certain users e.g., administrators. Additionally, or alternatively, in cases where verification fails, digital circuit 116 may be configured to boot into a safe mode, attempting to restore a trusted software version, or simply halting a processor and/or primary partition to prevent potential threats. Attested boot may include, without limitation cryptographically hashing one or more of hypervisor 148, inputs thereto, and/or outputs thereof, which may be digitally signed using secure computing module; such a cryptographic hash, known as a "measurement" for the purpose of this disclosure, may be stored in storage and/or secondary memory 140. Similarly, hypervisor 148 may hash and/or sign operating systems 160, containers 156, and/or programs executing thereon and store such measurements in secondary memory 140; hypervisor 148 may sign using secure computing module or any other private key and/or secret associated with hypervisor 148.

In an embodiment, and still referring to FIG. 1, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext.

In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Further referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=-R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, and still referring to FIG. 1, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, and continuing to refer to FIG. 1, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and with further reference to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Continuing to refer to FIG. 1, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, and with further reference to FIG. 1, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem. Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory 140 that may be overwritten and/or corrupted.

Continuing to refer to FIG. 1, a "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 1, field-deployable hardware apparatus 100 may include a virtual-path cross-connect (VPX) controller card. A "VPX controller card 172" for the purposes of this disclosure, is a controller card that has met the standards and/or limitations of the VMEbus International Trade Association (VITA). VPX standards may include standards such as but not limited to, specific size requirements, various high spend requirements. In one or more embodiments, VPX components may adhere to one of two form factors: a 3U form factor wherein the component must have a maximum width of 100 millimeters (mm) and a 6U form factor wherein the component must contain a maximum width of 160 mm. In one or more embodiments VPX controller card 172 may include a controller card having a maximum width of 100 millimeters. In one or more embodiments, VPX controller card 172 may include a maximum width of 160 millimeters. In one or more embodiments, VPX controller card 172 may include a 3U VPX controller card 172 wherein the controller card contains a maximum width of 100 mm and a maximum length of 160 mm. In one or more embodiments, VPX controller card 172 may contain a MultiGig RT2 connector or a MultiGig RT3 connector. In one or more embodiments, VPX components may follow an OpenVPX standard (VITA 66 and/or VITA 67) as established by the VMEbus International Trade Association. In one or more embodiments, VPX components such as, but not limited to VPX controller card 172 may contain temperature range requirements wherein the component must be able to operate between temperature of −40 degrees Celsius to 80 degrees Celsius. In one or more embodiments, VPX component may support high speed fabric interconnects in the range of 10 gbps to 100 gbps. In one or more embodiments, VPX component may contain secure boot software, tamper detection software and/or encrypted software. In one or more embodiments, VPX controller card 172 may be encrypted. In one or more embodiments, VPX controller card 172 may contain a secure boot software. In one or more embodiments, VPX controller card 172 may contain components that have been VPX certified and/or components that adhere to VPX standards. For example, and without limitation, embedded processors may include a VPX embedded processor wherein the embedded processor may adhere to VPX standards. In an embodiment, VPX controller card 172 may, as a non-limiting example, enable and/or govern connection of elements of bus 136 to one another and/or to exterior and/or peripheral devices, such as without limitation devices connected via input/output ports to field-deployable hardware module.

With continued reference to FIG. 1, memory 140 may include instructions configuring the at least a core to verify a compliance of the hardware apparatus with at least a pre-determined safety standard 180 from a trusted repository by monitoring an adherence of the hardware apparatus to the pre-defined operational rule. As a non-limiting example, field-deployable hardware apparatus 100 may implement one or more aspects of Future Airborne Computing Environment (FACE™). As used in this disclosure, a "Future Airborne Computing Environment" is a technical standard and business strategy for promoting acquisition of open systems software architecture in aviation industry, specifically for military avionics system. In some cases, field-deployable hardware apparatus 100 may employ FACE approach, wherein at least processor core may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system 160 segments (OSS), platform specific services segment (PSSS), I/O service segment, transport services segment, and/or the like. In some cases, FACE may provide a bounding box around software items and APIs, i.e., FACE Boundary. In some cases, field-deployable hardware apparatus 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system 160 segment) configured to infer specific hardware assumptions.

With continued reference to FIG. 1, and as a further non-limiting example, in one or more embodiments, field-deployable hardware apparatus 100 may implement one or more aspects of Open Mission Systems (OMS). As used in this disclosure, an "open mission system" is a (government-owned) specification for creating an open and interoperable system architecture for military avionics and mission systems. In some cases, OMS initiative may be focused on standardizing interfaces of systems components to promote modularity and system upgrades with minimal impact on existing system components. In one or more embodiment, OMS and FACE may include implementation of one or more modular open system approaches, wherein the "modular open system approach (MOSA)" is a strategy and methodology for system design that encourages the use of modular, interoperable components that follows open standards. It should be noted that while MOSA is used intensively in military and aerospace applications, it may also be applicable to any complex system that requires flexibility, scalability, and upgradeability over time. In a non-limiting example, OMS may apply one or more MOSA principles to create a standardized approach to mission system architecture in military aviation, wherein the MOSA principles may define one or more open interfaces for systems as described herein e.g., sensors, weapons, communications, propulsion, and/or the like. This may include, without limitation, a unified system that integrates a plurality of platforms and hardware components, in some cases, sensors for real-time data sharing and decision-making regarding one or more on-going missions. In one or more embodiments, field-deployable hardware apparatus 100 may implement one or more aspects of the Modular Open Systems. Any or all of the above standards may be applied with Kubernetes orchestration. Field-deployable hardware apparatus 100 may be configured to perform according to one or more other standards, such as Airworthiness and Security Accreditation CATO, military messaging standards such as Link 16, Cursor-on-Target, or the like.

Still referring to FIG. 1, field-deployable hardware apparatus 100 may include one or more input/output (IO) ports. For instance, and without limitation, field-deployable hardware apparatus 100 may include at least a high density input and output port 184 communicatively connected to the graphical processing unit and the general-purpose processor. A "high density input and output port 184," as used in this disclosure, is an input and output port that can transmit and/or receive a large number of bits per clock cycle for a clock regulating overall system, GPU 120, and/or GPP 128. High density input and output port 184 may include, without limitation, a port with a number of lanes above a threshold amount, where, for instance, a four-bit connector is capable of sending four bits in parallel while a 16-bit connector is capable of sending 16 bits in parallel. A high-density port may alternatively or additionally use a higher-speed localized clock to serialize input or output at rates higher than permitted by a system or processor clock; for instance, a parallel-to-serial hardware driver may operate on a localized clock at twice the rate of a GPU 120 and/or GPP 128 clock, permitting transmission of two bits per lane per GPU 120 and/or GPP 128 clock cycle off of a register with twice the number of bits as lanes. As a non-limiting example, a port with 16 bits may be able to send 32 bits per GPP 128 and/or GPU 120 clock cycle out of a 32-bit register supplied by a GPP 128 and/or GPU 120 once per clock cycle, using a localized application-specific integrated circuit (ASIC) and/or field-programmable gate array (FPGA) with a double-speed clock. This may alternatively or additionally be performed using double-edge triggering, such as triggering on rising and falling edges of a clock, triggering using multiple voltage level thresholds, or the like.

Continuing to refer to FIG. 1, and as a non-limiting example, IO ports may include one or more PCIe ports such as PCIe x2, x4, x16 ports, having 2, 4, 8, or 16 lanes respectively; ports with greater numbers of lanes and/or lanes that are not powers of two may be used as well. IO ports may include, as a further non-limiting example, an Ethernet port and/or connector, such as without limitation a 10/100/1000 BASE-T Ethernet downlink-to-switch port. IO ports may include, without limitation one or more serial ports such as a united serial bus 136 (USB) port, including without limitation a USB 3.0 device, a universal asynchronous receiver/transmitter (UART) port, or the like. Registers and/or memory addresses may store data with one or more bits of error correcting code (ECC), such as without limitation 8 bits or more of ECC. ECC bits may be allocated to individual bytes, data words, or the like; for instance, where there are 8 bits of ECC per 64 bits of data, data may be stored, in 72-bit lots, in 64-bit words with 8 ECC bits per word, 32 bit words with 4 ECC bits per word, and/or 1 bit per byte. Alternatively or additionally, further ECC bits may be stored per 32-bit or 64-bit word, and/or additional data resources within data words may be dedicated to one or more ECC protocols. Alternatively or additionally, memory of apparatus and/or multiple apparatuses connected together may be stored redundantly; that is, two or more data records such as words, bytes, or the like may be stored per element of data in different hardware locations. Hardware locations may be on separate buses, in different hardware modules, or the like. In an embodiment, redundant storage may be used to correct errors in more bits than can be corrected using a given ECC protocol; alternatively or additionally, where one memory module used in redundant storage is determined to have corruption above a threshold level, another redundant lot and/or module of memory may be used instead of the corrupted one.

Still referring to FIG. 1, ECC memory may be used to verify data stored in memory and/or identify errors in data stored in memory. Use of ECCs may include encoding of a message or lot of data using redundant information, permitting recovery of corrupted data. An ECC may include a block code, in which information is encoded on fixed-size packets and/or blocks of data elements such as symbols of predetermined size, bits, or the like. An ECC may include Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q-k-1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code. Use of ECCs may enable a datum to be scanned, read, evaluated, and/or verified.

Still referring to FIG. 1, field-deployable hardware apparatus 100 may be used, without limitation, to support one or more applications, including third-party applications. Applications may be executed, without limitation using and/or in a virtual environment 152, a container 156, an operating system 160, or the like. Applications may include, without limitation, machine-learning applications, sensor processing applications, cryptographic applications, cryptanalysis applications, mission management applications, navigation applications such as without limitation Positioning, Navigation, and Timing (APNT) applications, and/or any other examples that may occur to persons skilled in the art upon reviewing the entirety of this disclosure.

Figure 2:
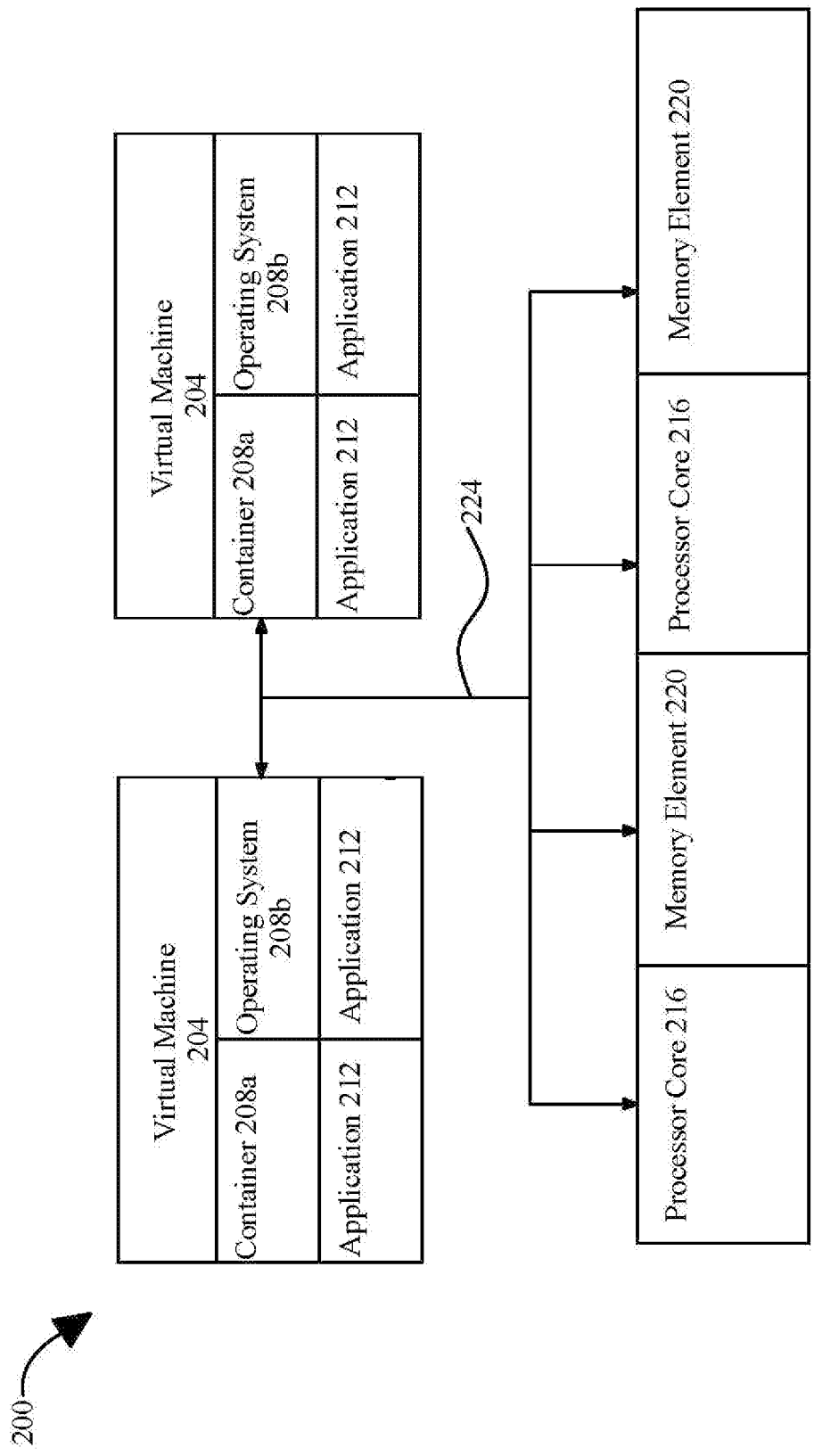
FIG. 2 is a block diagram illustrating an exemplary embodiment of a virtual environment.

Referring now to FIG. 2, an exemplary embodiment of a virtual environment 200 is illustrated. Virtual environment includes one or more virtual machines 204, which may be implemented in any manner described above and/or in disclosures incorporated herein by reference. Each virtual machine 204 may run a container 208a and/or operating system 208b, executing applications 212, which may include without limitation third-party applications, in the virtual machine 204. Virtual machines 204 and/or components therein may interface with one another, with other virtual environments, virtual machines, applications, operating systems, or the like, and/or with physical components such as processor cores 216 and/or memory elements 220 such as dedicated memory units and/or partitions, via a virtual bus 224. As used in this disclosure, a "virtual bus" is a software construct that mimics the functionality of a physical bus. In an embodiment, (I/O) virtual bus 224 may include a virtualization of I/O physical bus that facilitates communication between different components within virtual environment or even different virtual environments. In a non-limiting example, virtual bus 224 may connect first partition with second partition. In some cases, a management VM (i.e., first partition) may send one or more administrative commands to software module (i.e., second partition). Additionally, virtual bus 224 may also connect first partition with plurality of third partitions, allowing management VM to communicate with other ancillary or service-oriented partitions as described above. Virtual bus 224 may be set up in such a way that second partition is isolated from direct communication with plurality of third partitions; this means that any communication to or from second software module must go through first partition. In this case, software application running on second partition may not be able to directly access or be accessed by one or more services or functions running on plurality of third partitions. In a non-limiting example, plurality of third partitions may include various utility services e.g., logging, diagnostics, communication, backup services, wherein the virtual bus 224 may ensure second partition e.g., flight navigation system can only communicate with a controller-management VM, and not directly with other utility services which may be less secure. Virtual bus may connect, without limitation, to an exterior virtual environment.

Referring now to FIG. 3, peripheral connections associated with field-deployable hardware apparatus 100 in an exemplary embodiment are illustrated. Field-deployable hardware apparatus 100 may be connected via any I/O ports and/or connectors to an input device 304. In one example, a user of field-deployable hardware apparatus 100 may enter commands and/or other information into field-deployable hardware apparatus 100 via input device 304. Examples of an input device 304 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 304 may be interfaced to bus via any of a variety of interfaces (not shown) including, but not limited to, a serial interface, a parallel interface, a game port, a USB interface, a FIREWIRE interface, a direct interface to bus, and any combinations thereof. Input device 304 may include a touch screen interface that may be a part of or separate from display, discussed further below. Input device 304 may be utilized as a user selection device for selecting one or more graphical representations in a graphical interface as described above.

Still referring to FIG. 3, field-deployable hardware apparatus 100 may be connected via any I/O ports and/or connectors to one or more peripheral computing devices 308. A peripheral computing device 308 may include any computing device that may be stacked and/or combined with field-deployable hardware apparatus as described above, including without limitation another field-deployable hardware apparatus, another computing device with similar components and/or configuration, and/or a third-party device. A peripheral computing device 308 may share a virtual environment with elements of field-deployable hardware apparatus 100 and/or may deploy and/or operate one or more virtual environments, virtual machines, containers, applications, or the like, which may interface with virtual environments, virtual machines, containers, applications, or the like operating on field-deployable hardware apparatus, without limitation, using a virtual bus as described above.

Further referring to FIG. 3, commands and/or other information may be provided to field-deployable hardware apparatus 100 via a storage device 312 (e.g., a removable disk drive, a flash drive, etc.) and/or network interface device 316, either of which may be connected to field-deployable hardware apparatus 100 via I/O ports or connectors. A network interface device, such as network interface device 316, may be utilized for connecting field-deployable hardware apparatus 100 to one or more of a variety of networks, and/or one or more remote devices connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network !! 44, may employ a wired and/or a wireless mode of communication. In general, any network topology may be used. Information (e.g., data, software, etc.) may be communicated to and/or from field-deployable hardware apparatus 100 via network interface device 316.

Field-deployable hardware apparatus 100 may further be connected to a display 320, for instance, via a video display adapter 324 for communicating a displayable image to a display device, such as display 320. Examples of a display device include, but are not limited to, a liquid crystal display (LCD), a cathode ray tube (CRT), a plasma display, a light emitting diode (LED) display, and any combinations thereof. Display adapter 324 and display device 320 may be utilized in combination with elements of filed-deployable hardware apparatus to provide graphical representations of aspects of the present disclosure. In addition to a display device, field-deployable hardware apparatus 100 may include one or more other peripheral output devices including, but not limited to, an audio speaker, a printer, and any combinations thereof. Such peripheral output devices may be connected to bus via a peripheral interfaces.

Still referring to FIG. 3, peripheral devices connected to field-deployable hardware apparatus 100 may include one or more sensors, transducers, or other data capture devices. Data capture devices may include, without limitation, a gigabit multimedia serial link (GMSL) camera 328. A "GMSL camera," as used in this disclosure, is a camera connected to field-deployable hardware apparatus 100 and/or other apparatuses and/or components via a GMSL link, which is able to input data from a wide variety of I/O connections and/or using a wide variety of I/O protocols, including without limitation GPIO, I²C, UART, SPI, Audio I²S, Ethernet, and/or video input feeds such as CSI-2, DP, HDMI, DSI, OLDI, or the like, convert data therefrom into a serial stream on the order of 6-12 gigabits per second, transmit the serialized signal over a cable such as a coaxial or STP cable, deserialize the signal, and output using any or all protocols and/or connectors described above. A camera connected thereto may be able to transmit large volumes of video data to field-deployable hardware apparatus 100 for rapid processing, video analysis, and/or other applications on field-deployable hardware apparatus 100 or other devices connected thereto.

Figure 4A:
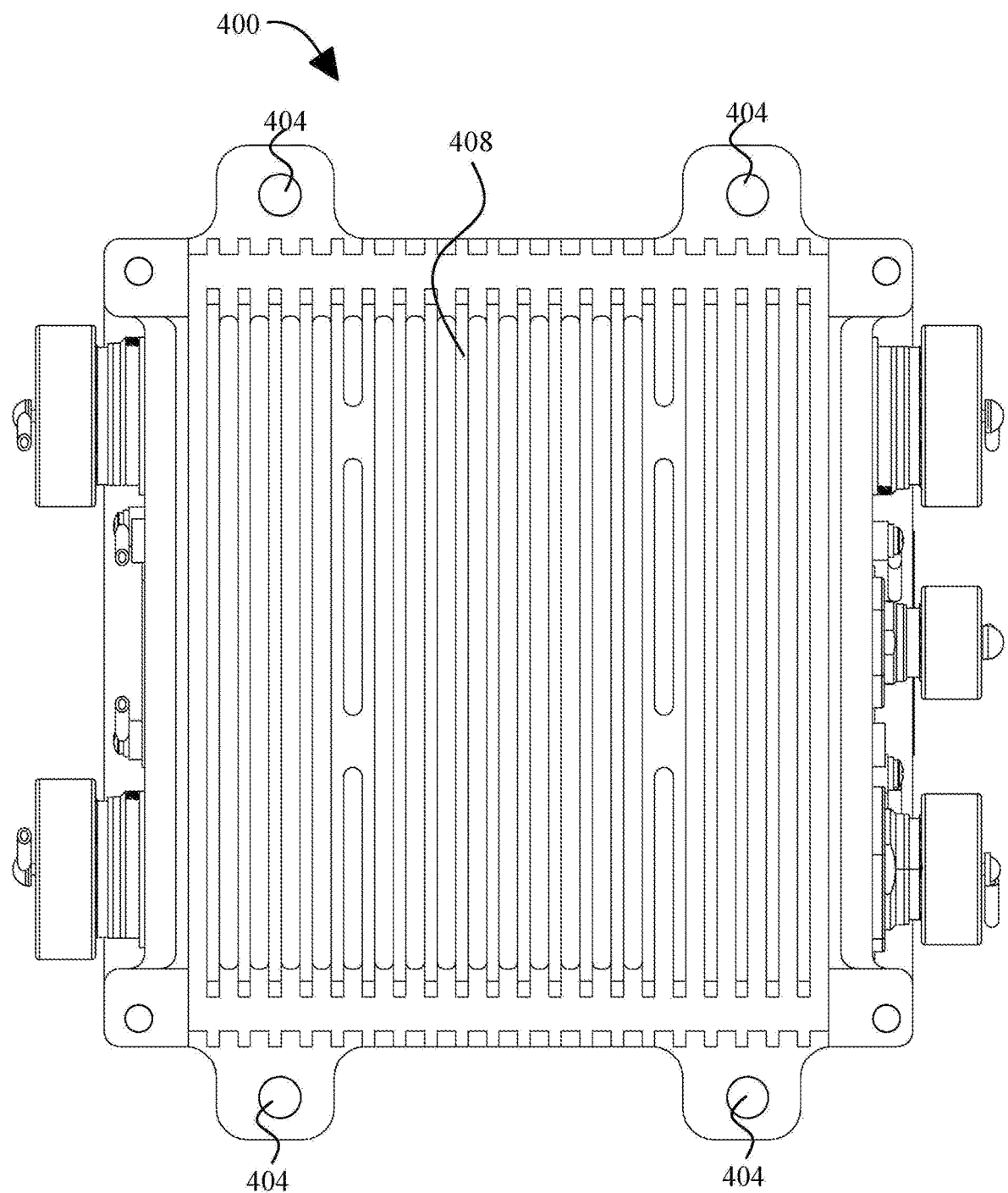
FIG. 4A-4F is a schematic diagram illustrating an exemplary embodiment of a housing. The drawings are not necessarily to scale and may be illustrated by phantom lines, diagrammatic representations and fragmentary views. In certain instances, details that are not necessary for an understanding of the embodiments or that render other details difficult to perceive may have been omitted.

Referring now to FIG. 4A, an exemplary embodiment of a housing 400 is illustrated. One or more attachment features may be used to stack or otherwise join housing 400 to other devices, while I/O ports and/or connectors as described above may be used to connect devices together communicatively as described above. Housing may include one or more attachment features 404 as described above. Housing may have one or more heat-dissipating exterior structures 408 such as fins and/or ridges, which may increase a surface area for heat dissipation through convection and/or radiation. In an embodiment, and without limitation, housing may be installed in an environment with air circulation, fans, air conditioning or the like; for instance and without limitation, a fan, impeller, or other blower may blow air over housing and heat-dissipating exterior structures 408 to aid in cooling off housing and thus apparatus 100.

Figure 4B:
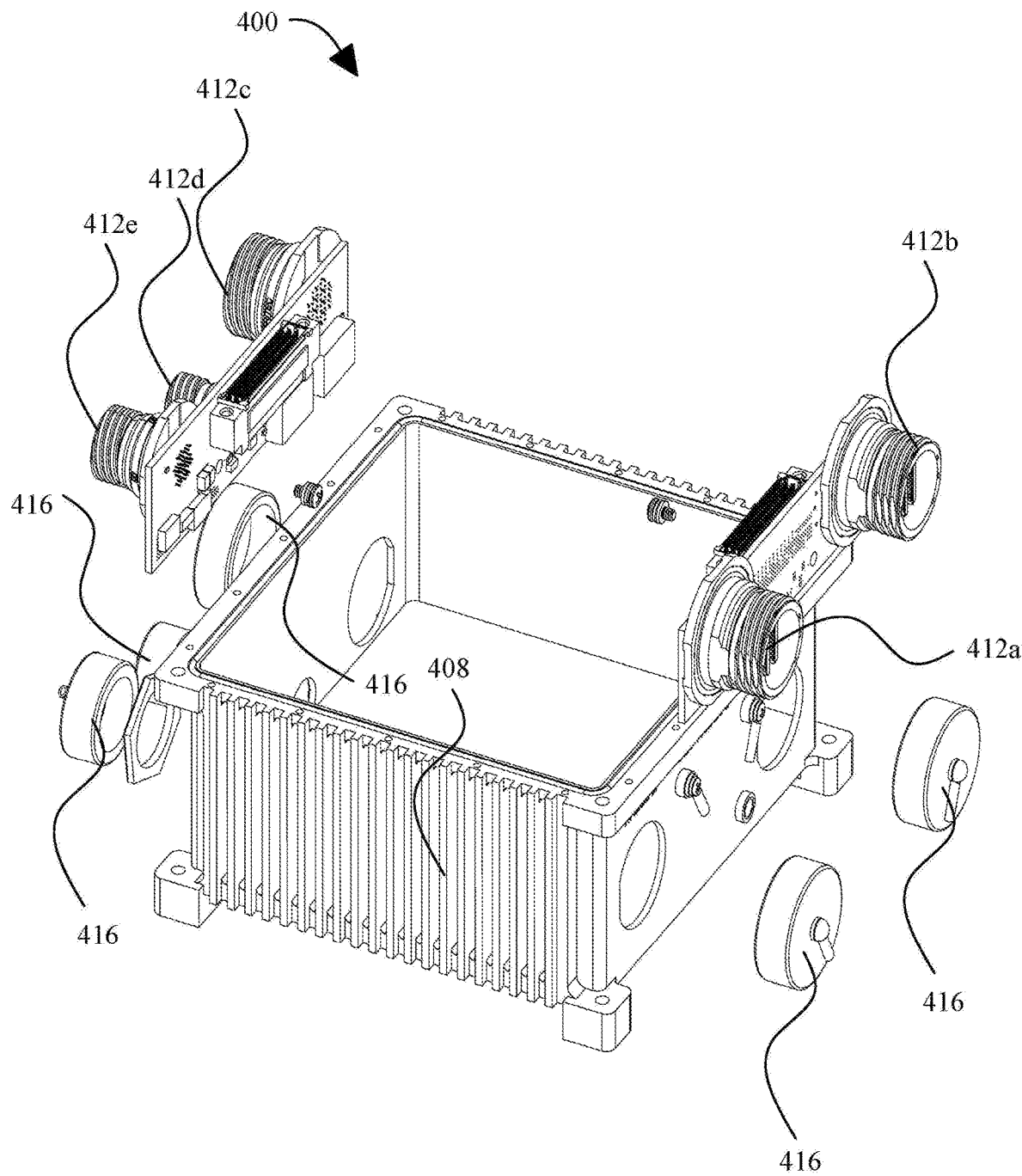

Referring now to FIG. 4B, a non-limiting example of a partially exploded view of housing 400 and some components thereof is illustrated. Housing 400 may include one or more connectors 412*a-e* having closures 416; closures 416 may protect connectors from water or other contaminants during transport and/or prior to deployment and/or connection to other devices, components, peripherals, or the like as described above. Closures 416 may, in a non-limiting example, be screw-down closures, latched closures, or the like. Closures 416 may include one or more elements to make closures 416 watertight, water resistant, airtight, or the like, such as elastomeric inserts made of, e.g., artificial rubbers, natural rubbers, silicone, or the like; such elements may include O-rings, sleeves, and/or other seal elements, which may be disposed, without limitation, within a cap formed by a closure and/or on or around a projecting element of connectors 412*a-c*. Projecting elements of connectors 412*a-e* may include tubular projections having an exterior wall, which may be, e.g., cylindrical, be substantially cylindrical, and/or may have any polygonal and/or curved form and/or any combination thereof, and which may have electronic elements of connectors 412*a-e* disposed within such wall. Exterior and/or interior of wall may include reciprocal threading that may engage corresponding threading in and/or on closures 416, latching elements to engage latching elements of closures 416, or the like. Closures 416 may form an engineering fit and/or press fit over projecting elements, which may serve as an alternative or addition to latching, threading, or the like. Closures 416 may be tethered to housing 400, for instance using cables, lanyards, or other flexible and/or rigid elements; such elements may be constructed of steel or other metal cabling, polymer and/or plastic cabling, one or more rigid slidable and/or jointed sections, or the like.

Still referring to FIG. 4B, connectors 412a-e may correspond to and/or include electronic connections to any or all ports of apparatus 100 as described in this disclosure and/or that may occur to a person skilled in the art upon reviewing the entirety of this disclosure. As a non-limiting example for illustrative purposes, connectors 412a-e may include a PCIE in connector 412a, a PCIE out connector 412b, an ethernet and/or USB connector 412c, a console connector 412d, a power connector 412e, or any other suitable connector. Connectors may be affixed to, plugged into, and/or electronically connected to a connector board as described in further detail below. A board and/or integrated circuit connected to and/or affixing connectors 412a-e may have connectors attached thereto using, without limitation, adhesion, screws, rivets, bolts, soldering, and/or any other suitable form of attachment. Projecting elements may be attached to such board and/or integrated circuit and projected from within housing 400 through openings therein; alternatively or additionally projecting elements may be affixed to an exterior of housing 400 or formed therewith as a monolithic whole. Each board and/or integrated circuit connected to and/or affixing connectors 412a-e may be mounted within housing. Each board and/or integrated circuit connected to and/or affixing connectors 412a-e may be orthogonal to a connector board as described in further detail below.

Figure 4C:
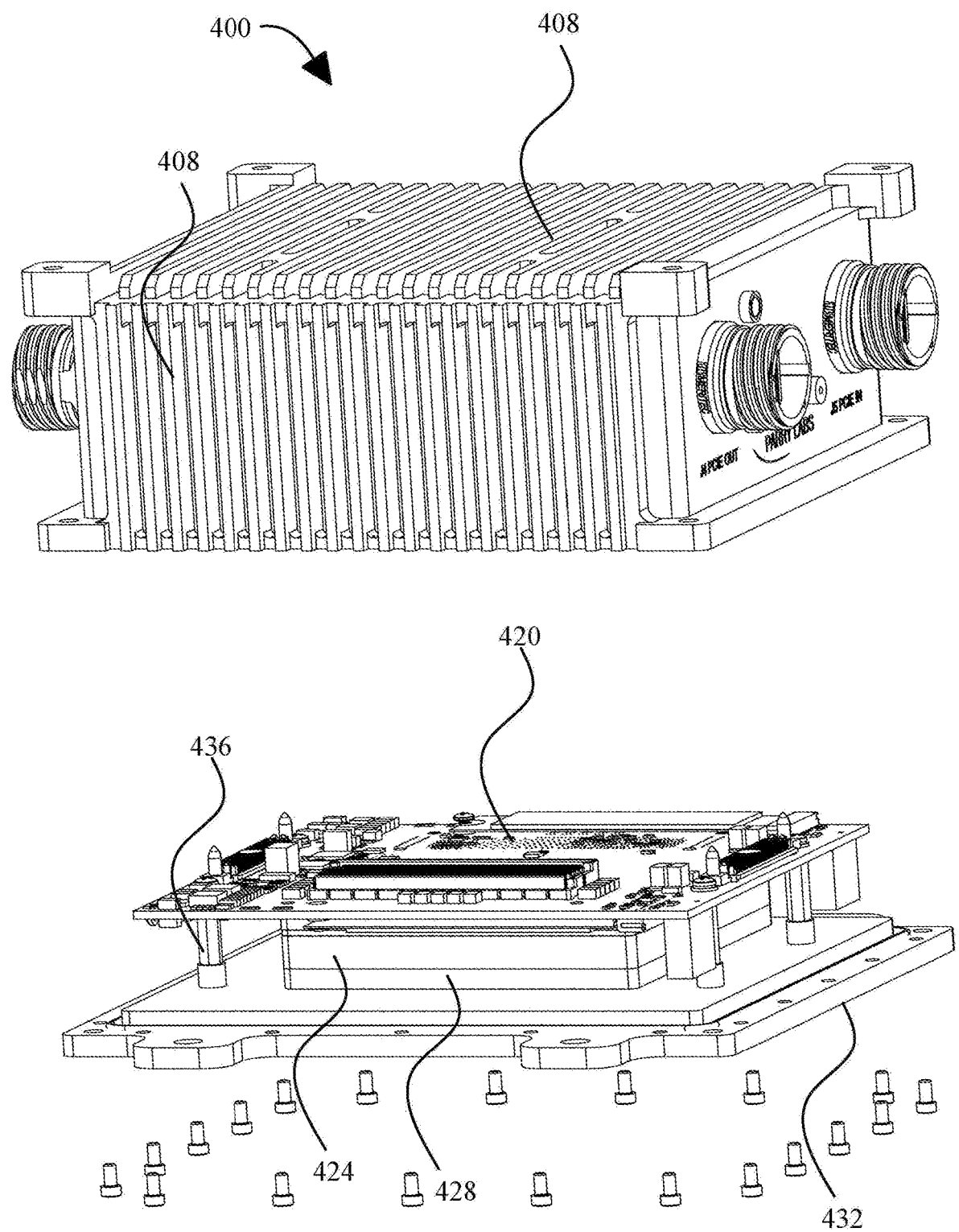

Referring now to FIG. 4C, a partially exploded view of an exemplary embodiment of apparatus 100 as enclosed by housing 400 is illustrated. Apparatus 100 may include a connector board 420, which may electronically and/or communicatively connect two or more elements of apparatus 100 such as GPP, GPU, or the like; one or more communicative paths such as portions of bus and/or connections to connectors 412a-e may be included in connector board 420. Connector board 420 may be connected to a processor block 424, which may contain one or more of at least a GPP and/or at least a GPU as described above. Processor block 424 may in turn be in thermal contact with a cooling plate 428, which may in turn be in thermal contact with an underside 432. Underside 432 may be affixed to a remainder of housing 400 to enclose electronic elements of apparatus 100 therein. Portions of housing 400 may be connected to one another using screws, latches, bolts, rivets, adhesives, and/or any other suitable attachment mechanisms. Portions of housing 400 may be sealed to one another using sealants to effect watertight, water resistant, airtight, or other seals; this may be implemented without limitation in any manner described above for closures 416.

Heat-dissipating exterior structures 408 may be on two or more surfaces of housing 400, including lateral surfaces that do not include connectors 412a-e, an upper surface, and/or any other surface. In an embodiment, a design of apparatus 100 may lack cooling fans and/or other blowers in the interior of apparatus 100; apparatus 100 may dispose of waste heat from electronic components thereof by sinking heat off via heat-dissipating exterior structures 408 into an external enclosure in which housing 400 and/or apparatus 100 is contained and/or deployed, such as a room, vehicle interior, or the like. Internally, conductive heat sinks 436 may connect to one or more hot spots on circuit elements of apparatus 100, where "conductive" indicates a high thermal transfer coefficient such as that possessed by metals such as aluminum, copper, steel, or the like. Such heat sinks and/or heat sink connections may include cooling plate 428 to which one or more of connector board 420 and/or at least a processor block 424 may be thermally connected.

Figure 4D:
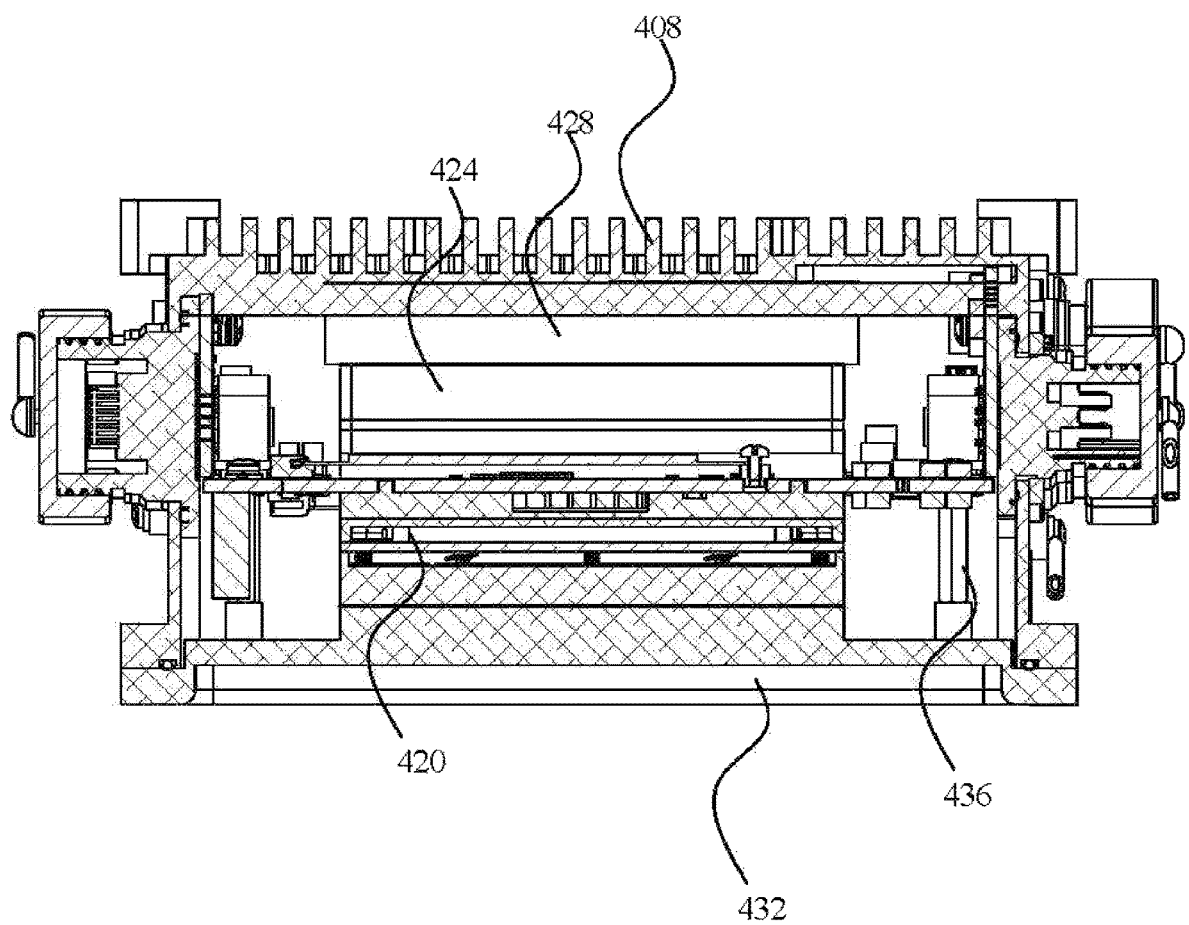

Referring now to FIG. 4D, a non-limiting exemplary embodiment of a cross-sectional view of apparatus within housing is illustrated. As illustrated here, a cooling plate 428 may alternatively or additionally be disposed between a processor block 424 and an upper surface of housing 400. Housing may, in a non-limiting embodiment, be constructed of thermally conductive material as described above, such as without limitation metal such as steel or aluminum.

Figure 4E:
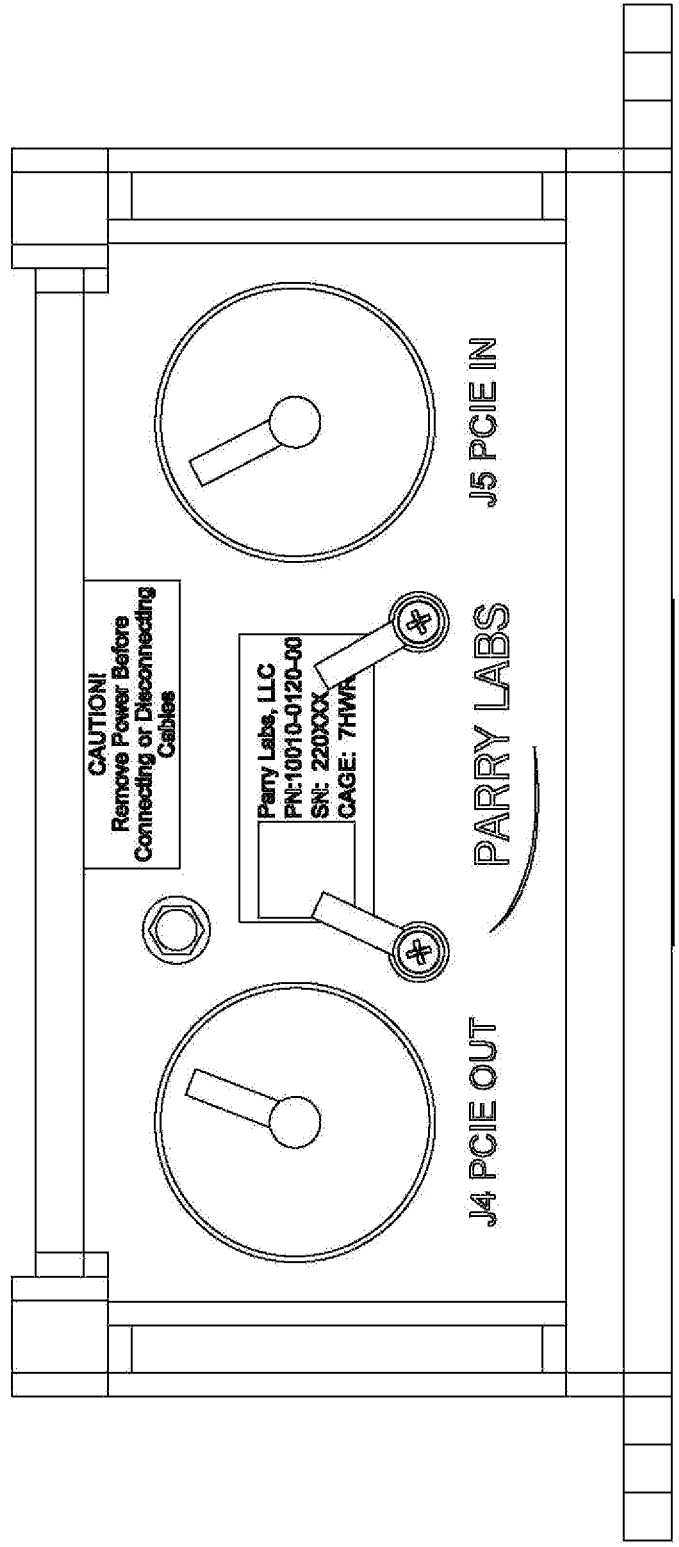
Figure 4F:
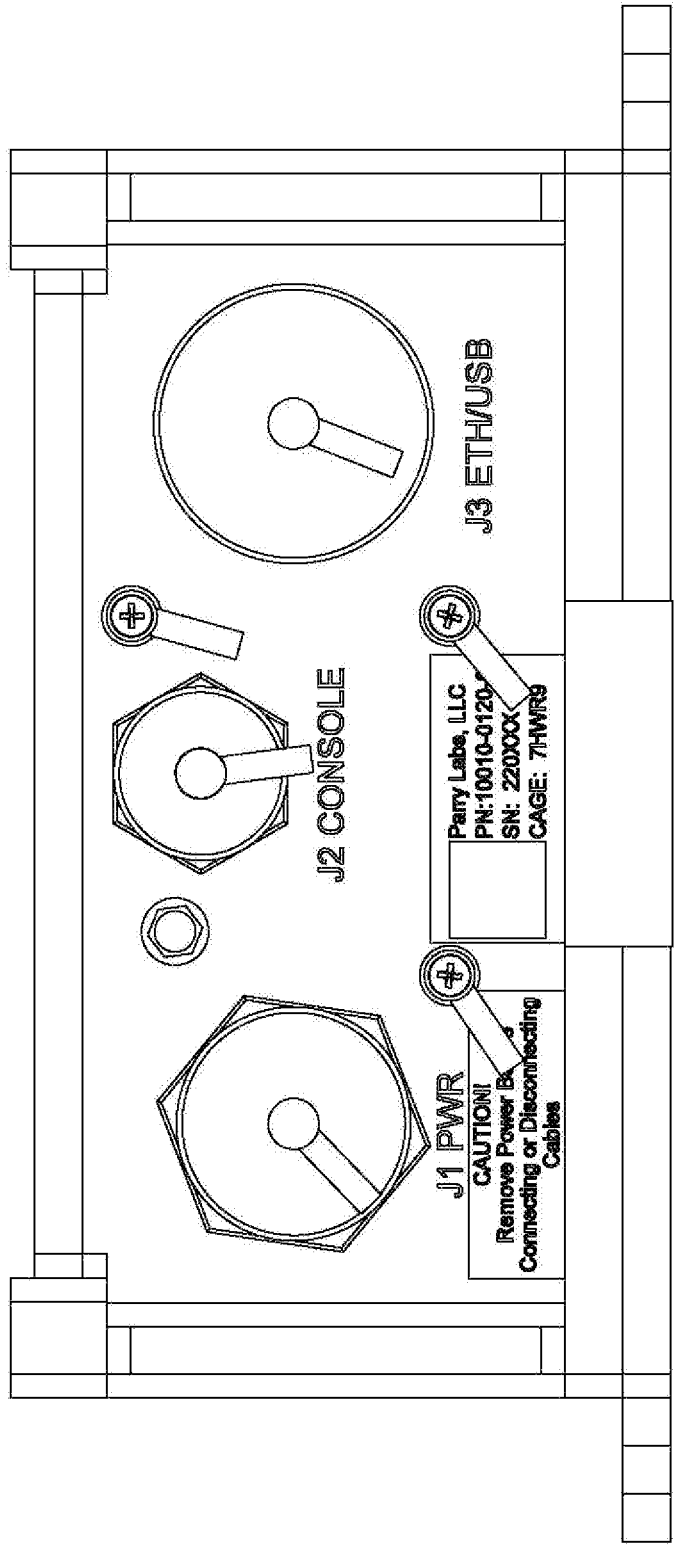

FIGS. 4E-4F illustrate exterior views of exemplary embodiments of housing, with, respectively, PCIE In and PCIE OUT connectors with closures shown, and power, consol, and ethernet/USB connectors with closures shown.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A field-deployable hardware apparatus comprising:
    a stackable housing comprising one or more attachment features configured to secure the stackable housing to, and above or below, an adjacent housing of an adjacent field-deployable hardware apparatus, wherein the stackable housing comprises a waterproof construction including one or more sealable openings;
    a graphical processing unit disposed within the stackable housing, the graphical processing unit comprising a first plurality of processor cores;
    a general-purpose processor disposed within the stackable housing, the general-purpose processor comprising a second plurality of processor cores;
    at least a binary unit system disposed within the stackable housing and connecting the graphical processing unit to the general-purpose processor; and
    a memory communicatively connected to at least a core of the first plurality of cores and the second plurality of cores, the memory containing instructions configuring the at least a core to execute a hypervisor, wherein the hypervisor generates a virtual environment on the at least a core.

2. The apparatus of claim 1, wherein the stackable housing comprises heat-dissipating construction.

3. The apparatus of claim 1, wherein the general-purpose processor further comprises a reduced instruction set computer.

4. The apparatus of claim 1, wherein the memory further comprises a per-processor memory.

5. The apparatus of claim 1, wherein the memory comprises a boot partition.

6. The apparatus of claim 5, wherein the boot partition comprises a trusted boot module.

7. The apparatus of claim 6, wherein the trusted boot module is configured to perform a secure proof protocol.

8. The apparatus of claim 6, wherein the trusted boot module is configured to perform an attested boot of the hypervisor.

9. The apparatus of claim 1, wherein the hypervisor comprises a virtual machine monitor software.

10. The apparatus of claim 1, wherein the hypervisor includes a bare metal hypervisor.

11. The apparatus of claim 1, wherein the hypervisor includes a Type 2 hypervisor.

12. The apparatus of claim 1, wherein the hypervisor is configured to execute at least a container.

13. The apparatus of claim 1, wherein the hypervisor is configured to execute at least an operating system.

14. The apparatus of claim 1, wherein the virtual environment comprises a virtual binary unit system.

15. The apparatus of claim 14, wherein the virtual binary unit is communicatively connected to an exterior virtual environment.

16. The apparatus of claim 1, wherein the hardware apparatus comprises a trusted platform module.

17. The apparatus of claim 1 further comprising a virtual-path cross-connect controller card.

18. The apparatus of claim 1, wherein the memory contains instructions configuring the at least a core to verify a compliance of the hardware apparatus with at least a pre-determined safety standard from a trusted repository by monitoring an adherence of the hardware apparatus to the pre-defined operational rule.

19. The apparatus of claim 1 further comprising at least a high density input and output port communicatively connected to the graphical processing unit and the general-purpose processor.

* * * * *